United States Patent
Hira et al.

(10) Patent No.: US 11,374,899 B2
(45) Date of Patent: *Jun. 28, 2022

(54) MANAGING NETWORK CONNECTIVITY BETWEEN CLOUD COMPUTING SERVICE ENDPOINTS AND VIRTUAL MACHINES

(71) Applicant: Nicira, Inc., Palo Alto, CA (US)

(72) Inventors: Mukesh Hira, Palo Alto, CA (US); Sandeep Siroya, Santa Clara, CA (US)

(73) Assignee: Nicira, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/069,197

(22) Filed: Oct. 13, 2020

(65) Prior Publication Data

US 2021/0029077 A1   Jan. 28, 2021

Related U.S. Application Data

(63) Continuation of application No. 15/676,410, filed on Aug. 14, 2017, now Pat. No. 10,819,675.

(51) Int. Cl.
*H04L 61/5007* (2022.01)
*H04L 47/125* (2022.01)
(Continued)

(52) U.S. Cl.
CPC ........ *H04L 61/2007* (2013.01); *H04L 47/125* (2013.01); *H04L 61/2514* (2013.01);
(Continued)

(58) Field of Classification Search
CPC ............. H04L 61/2007; H04L 61/2521; H04L 61/2514; H04L 47/125; H04L 61/6018; H04L 67/10; G06F 2009/45595
See application file for complete search history.

(56) References Cited

U.S. PATENT DOCUMENTS

| | | | |
|---|---|---|---|
| 2012/0307828 A1 | 12/2012 | Agarwal et al. | |
| 2013/0044629 A1* | 2/2013 | Biswas | H04L 45/74 370/254 |

(Continued)

OTHER PUBLICATIONS

Lark: Bringing Network Awareness to High Throughput Computing (Year: 2015).*

(Continued)

*Primary Examiner* — Nicholas R Taylor
*Assistant Examiner* — Tania M Pena-Santana (57) ABSTRACT

Described herein are systems, methods, and software to enhance connectivity between cloud computing service endpoints and virtual machines. In one implementation, a method of managing data packet addressing in a first namespace includes receiving a data packet at a first interface for the first namespace, wherein the first interface is paired with a second interface of a second namespace. The method also includes identifying if the packet is destined for a service node in an underlay network outside of an overlay network for the second namespace, and if destined for a service node outside of an overlay network for the second namespace, modifying addressing in the data packet to support the underlay network and transferring the data packet over a virtual network interface for the virtual machine.

20 Claims, 7 Drawing Sheets

(51) Int. Cl.
*H04L 61/2514* (2022.01)
*H04L 61/2521* (2022.01)
*H04L 67/10* (2022.01)
*H04L 101/618* (2022.01)
*G06F 9/455* (2018.01)

(52) U.S. Cl.
CPC .................... *H04L 61/2521* (2013.01); *G06F 2009/45595* (2013.01); *H04L 61/6018* (2013.01); *H04L 67/10* (2013.01)

(56) References Cited

U.S. PATENT DOCUMENTS

| | | | |
|---|---|---|---|
| 2014/0279885 A1* | 9/2014 | Anantharam | G06F 9/45533 707/622 |
| 2015/0124821 A1* | 5/2015 | Chu | H04L 12/4633 370/392 |
| 2015/0381485 A1* | 12/2015 | He | H04L 12/4633 370/392 |
| 2016/0254968 A1* | 9/2016 | Ebtekar | H04L 41/12 709/223 |
| 2016/0292443 A1 | 10/2016 | von Muhlen et al. | |
| 2016/0323121 A1* | 11/2016 | Benny | H04L 45/74 |
| 2016/0352633 A1* | 12/2016 | Kapadia | H04L 12/4625 |
| 2016/0373327 A1 | 12/2016 | Degioanni et al. | |
| 2017/0331733 A1* | 11/2017 | Hooda | H04L 12/4633 |
| 2018/0063087 A1 | 3/2018 | Hira et al. | |
| 2018/0191471 A1* | 7/2018 | Elhaddad | H04L 1/24 |
| 2019/0068493 A1 | 2/2019 | Ram et al. | |
| 2020/0076685 A1* | 3/2020 | Vaidya | G06F 9/45558 |

OTHER PUBLICATIONS

Zhang et al., "Lark: Bringing Network Awareness to High Throughput Computing," 15th IEEE/ACM International Symposium on Cluster, Cloud and Grid Computing, 2015, 10 pages.

Mark Church, "Docker Reference Architecture: Designing Scalable, Portable Docker Container Networks," Jun. 20, 2017, Retrieved from the Internet: URL:https://success.docker.com/api/article s/networking/pdf on Sep. 13, 2018, 36 pages.

Jean-Tiare Le Bigot, "Introduction to Linux namespaces—Part 5: NET | Yet another enthusiast blog!," Jan. 19, 2014, Retrieved from the Internet: URL:https://blog.yadutaf.fr/2014/01/19/introduction-to-linux-namespaces-part-5-net/ on Oct. 26, 2018, 6 pages.

Dirk Merkel, "Docker: Lightweight Linux Containers for Consistent Development and Deployment," Linux Journal, vol. 2014 Issue 239, Mar. 1, 2014 , Retrieved from the Internet: URL:https://dl.acm.org/citation.cfm?id=260 0241 on Feb. 20, 2015, 16 pages.

International Search Report and Written Opinion issued in PCT Application No. PCT/US2018/046550 dated Nov. 7, 2018, 14 pages.

* cited by examiner

MANAGING NETWORK CONNECTIVITY BETWEEN CLOUD COMPUTING SERVICE ENDPOINTS AND VIRTUAL MACHINES

RELATED APPLICATIONS

This application is a continuation of U.S. application Ser. No. 15/676,410 entitled "MANAGING NETWORK CONNECTIVITY BETWEEN CLOUD COMPUTING SERVICE ENDPOINTS AND VIRTUAL MACHINES" filed Aug. 14, 2017, which is hereby incorporated by reference in its entirety.

BACKGROUND

Cloud computing services such as Google Cloud Platform®, Amazon Web Services®, and the like provide a dynamic platform for organizations to deploy and manage various applications and services. These cloud computing services permit organizations to generate and deploy virtual machines and manage the networks to which each of the virtual machines belong. For example, an organization may deploy a plurality of virtual machines to provide a database function for the organization. In deploying the virtual machines, an administrator may define switching, routing, and firewall policies to ensure security of the various virtual machines.

In addition to providing an efficient platform for organizations to deploy applications without managing local physical computing resources, cloud computing services may also provide additional services, such as load balancing services, database management services, or other similar services, wherein the services may operate on virtual and physical computing elements managed by the cloud computing service provider. Because these services are not deployed as virtual machines or containers managed by the customer organization, networking operations with the services may be difficult and cumbersome to manage. In particular, an organization may define an overlay network for its virtual machines in the cloud service provider network, however, any service that is provided by the cloud service provider may be incapable of identifying packets that correspond to this overlay network. As a result, difficulties arise in providing communications between the organization virtual machines and the required service.

OVERVIEW

The technology disclosed herein enhances the management of data packets communicated with a cloud computing provider service. In one implementation, a method of managing data packet addressing in a first namespace of a virtual machine includes receiving a data packet at a first interface for the first namespace, wherein the first interface is paired with a second interface of a second namespace. The method further provides identifying whether the data packet is destined for a service node in an underlay network outside of an overlay network for the first namespace. The method also includes, if the data packet is destined for a service node in an underlay network, modifying addressing in the data packet to support the underlay network, and transmitting the data packet over a virtual network interface for the virtual machine.

DETAILED DESCRIPTION

Figure 1:
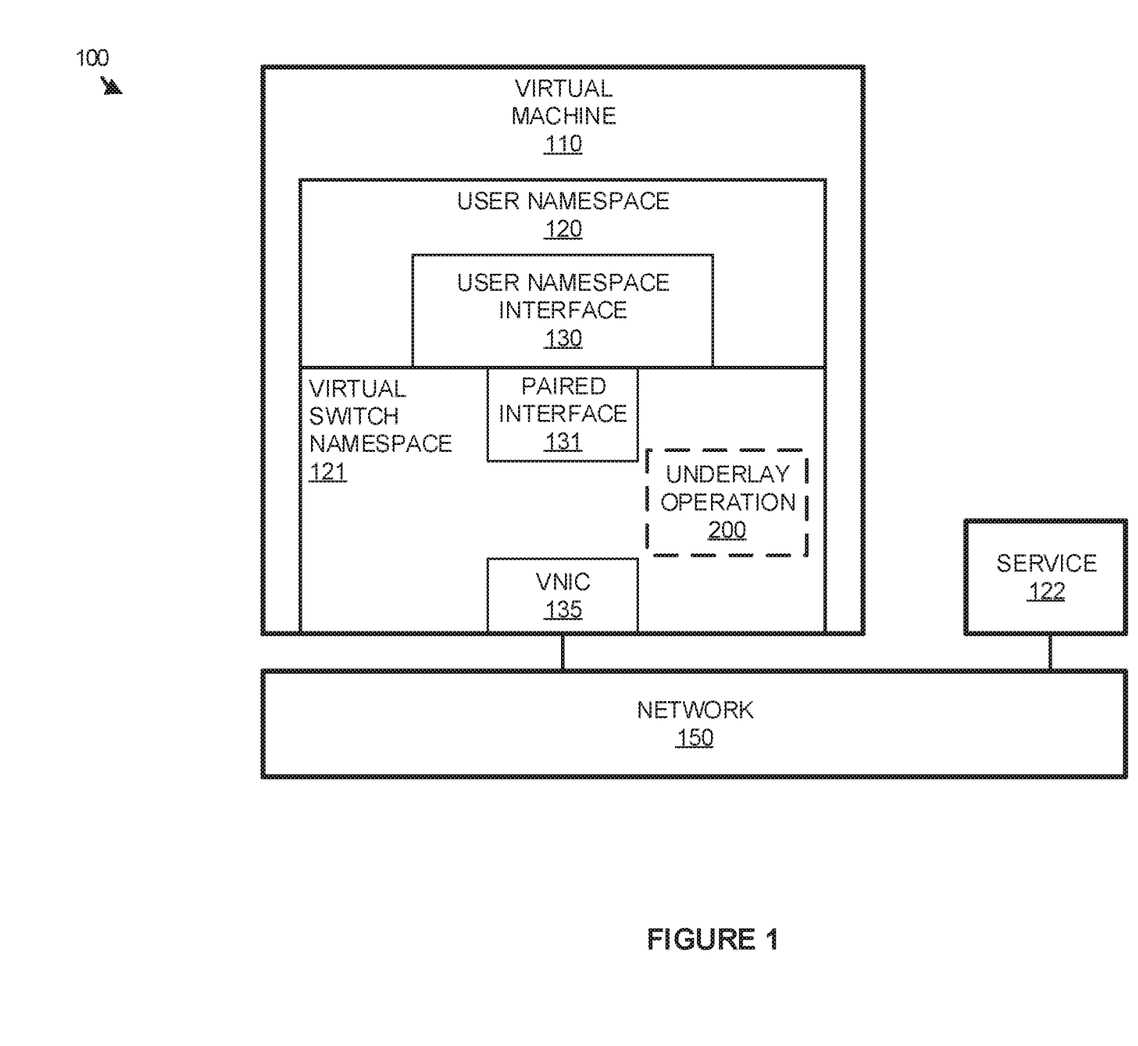
FIG. 1 illustrates a computing environment for managing data packet communications in a virtual machine according to an implementation.

FIG. 1 illustrates a computing environment 100 for managing data packet communications in a virtual machine according to an implementation. Computing environment 100 includes virtual machine 110, network 150, and service 122. Virtual machine 110 comprises user namespace 120 and virtual switch namespace 121, wherein the namespaces isolate and virtualize system resources for a collection of processes within the namespaces. In the present implementation, user namespace 120, which may comprise a root namespace in some examples, includes user namespace interface 130 and may further include software for one or more applications to perform a desired service for an organization, and virtual switch namespace 121 includes paired interface 131, virtual network interface (VNIC) 135, and underlay operation 200, which is further described in FIG. 2. User namespace interface 130 and paired interface 131 are representative of a veth pair or bridge, which comprises virtual network interfaces in each of the namespaces that are used to communicate data packets between the namespaces of the virtual machine. Virtual machine 110 communicates with service 122 using network 150. Network 150 may comprise software defined networking modules, physical switches and routers, computing systems, and other similar networking elements.

Figure 2:
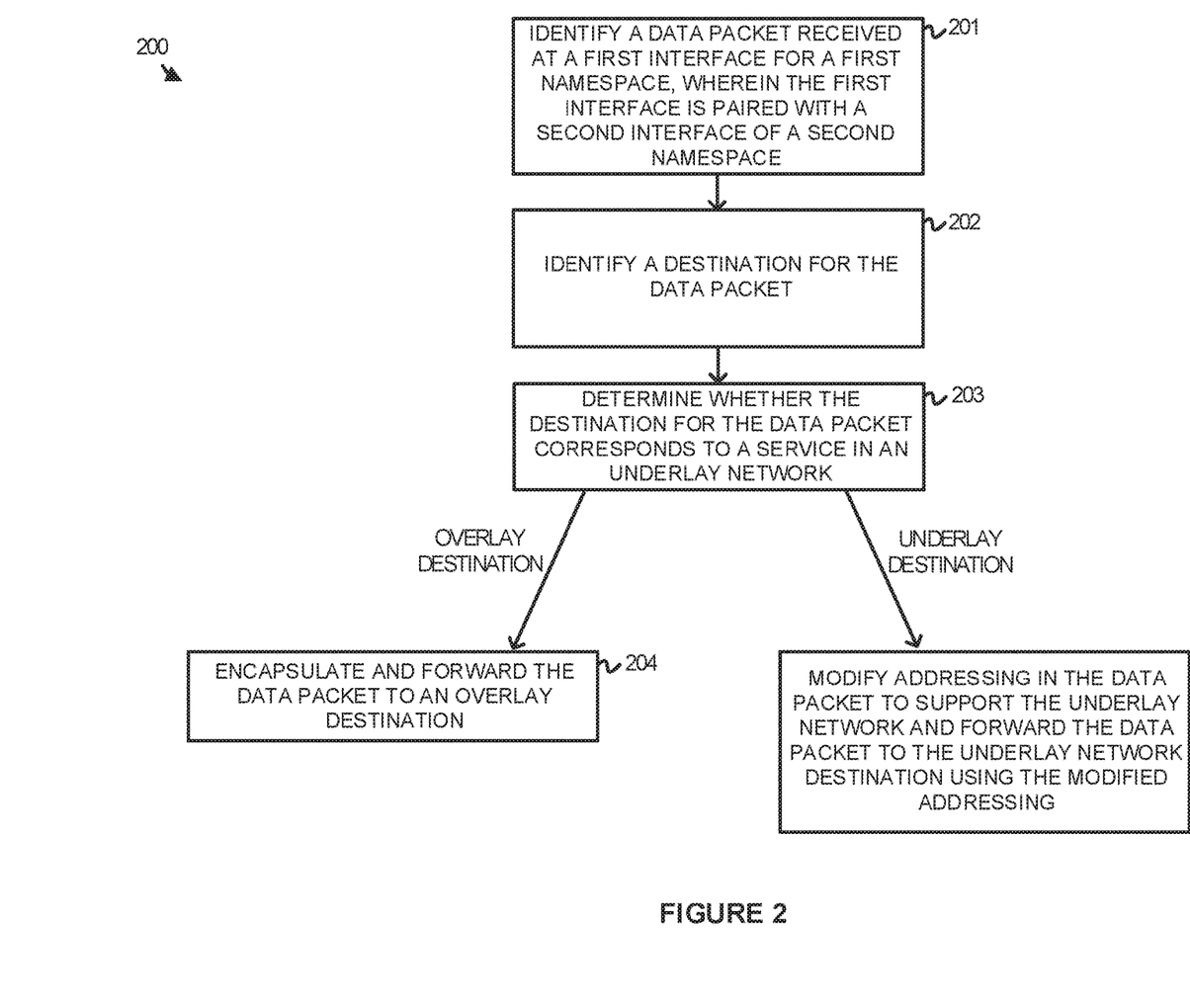
FIG. 2 illustrates an underlay network operation according to an implementation.

In operation, virtual machine 110 may be deployed by an organization to provide various functions and operations, wherein the operations may include database operations, data processing operations, or any other similar operation. In deploying the virtual machine, virtual machine 110 is separated into two namespaces, wherein user namespace 120 provides the application namespace to support the required applications and services for the virtual machine, such as database management, data processing, and the like, while virtual switch namespace 121 provides virtual switch operations for virtual machine 110. These virtual switch operations include underlay operation 200, and may further include other switching, routing, and distributed firewall operations. The namespaces may be used to separate process identifiers, network access, interprocess communications, and filesystems in some examples.

Here, in addition to virtual machine 110, service 122 is included, which may comprise a container, a virtual machine, a physical computing system, or some other similar computing node. Service 122 is representative of a service node that might be provided by a cloud computing service provider, which may provide various operations, such as load balancing, database access, or some other similar operation. As the service is provided by a cloud computing service, the service may not operate on the same overlay network as user namespace 120 of virtual machine 110. Consequently, while user namespace 120 may communicate with other computing nodes that are on the overlay network, service 122 may be incapable of processing packets in the overlay network format.

To overcome the deficiencies of the service executing outside of the overlay network for the virtual machine, virtual switch namespace 121 is provided. This second namespace is used to identify ingress and egress packets to and from the service for the user namespace and modify addressing of the packets to support the communications with the service. In particular, virtual switch namespace 121 may identify a destination address in a data packet associated with service 122, and translate the addressing of the data packet to support the communications with service 122.

FIG. 2 illustrates an underlay network operation 200 according to an implementation. The processes of operation 200 are referenced parenthetically in the paragraphs that follow with reference to systems and elements of computing environment 100 of FIG. 1.

As depicted, operation 200 receives (201) a data packet at a first interface for a first namespace, wherein the first interface is paired with a second interface of a second namespace. Referring to FIG. 1, virtual switch namespace 121 includes paired interface 131, which is paired to user namespace interface 130. This pairing of the interfaces (virtual network interfaces) ensures that any communication transmitted via user namespace interface 130 will be received by paired interface 131. Similarly, when a communication is transmitted over paired interface 131, the communication will be received by user namespace interface 130. As a result of the configuration, the applications and services executing within user namespace 120 may communicate as though user namespace interface 130 is a network interface for the virtual machine.

Once the data packet is received at virtual switch namespace 121, underlay operation 200 further includes identifying (202) a destination for the received data packet. In particular, the packet received at paired interface 131 may include addressing information, such as a source internet protocol (IP) address associated with an overlay network address for the virtual machine, a destination IP address for the destination computing node, source and destination port addressing information, as well as any other similar addressing information. Once a destination is identified for the data packet (e.g. the destination IP address for the data packet), operation 200 determines (203) whether the destination for the data packet corresponds to a service in an underlay network that is outside the overlay network for user namespace 120. In some implementations, virtual switch namespace 121 may maintain at least one data structure to identify destination addresses that correspond to services in an underlay network. If a destination network address is identified that corresponds to service in the underlay network using the one or more data structures, then operation 200 may modify (205) addressing in the data packet to support the underlay network and forward the data packet to the underlay network destination using the modified addressing.

In some implementations, in modifying the network addressing, virtual switch namespace 121 may perform source network address translation that can translate the source IP address associated with user namespace 120 to a second source IP address associated with VNIC 135 and virtual machine 110. As a result, when the communication is received at service 122, service 122 may identify an appropriate source IP address for virtual machine 110 that corresponds to the virtual machine's address on the underlay network. Further, when a communication is returned from service 122, underlay operation 200 may be used to translate the underlay IP address for VNIC 135 and virtual machine 110 to the overlay IP address associated with user namespace 120. Once translated, the packet from service 122 may be provided to user namespace 120 using paired interface 131.

In addition to identifying packets that are destined for services on an underlay network, underlay operation 200 may further identify that a destination corresponds to an overlay network destination. In these examples, rather than replacing addressing information for the packet, underlay operation 200 may encapsulate (204) the data packet and forward the encapsulated data packet to the overlay destination. For example, if an application in user namespace 120 were communicating with a second virtual machine on the same overlay network, underlay operation 200 may encapsulate data packets as they are received at paired interface 131 and forward the communications to the second virtual machine using VNIC 135. This encapsulating may include adding additional header information to the packet, such as underlay source and destination network addressing, port addressing, and the like for the virtual machines.

Figure 3:
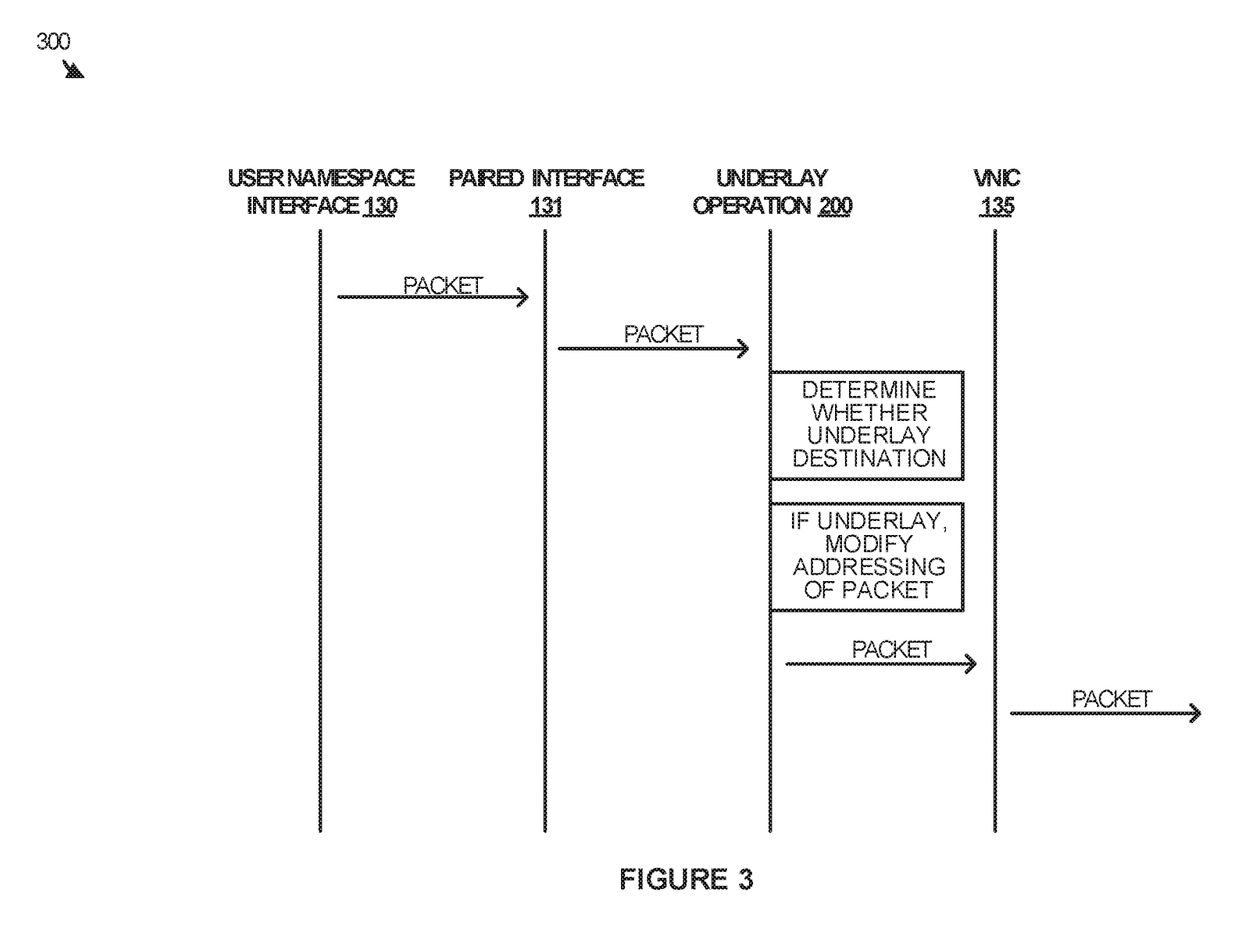
FIG. 3 illustrates an operational scenario of transmitting a communication from a virtual machine according to an implementation.

FIG. 3 illustrates an operational scenario 300 of transmitting a communication from a virtual machine according to an implementation. Operational scenario 300 includes user namespace interface 130, paired interface 131, underlay operation 200, and VNIC 135 of computing environment 100 of FIG. 1.

As depicted, user interface 130 may provide a packet to paired interface 131, wherein interfaces 130-131 comprise a veth pair or bridge, such that data transmitted at user namespace interface 130 is received by paired interface 131 in a separate namespace. Likewise, data to be transmitted at paired interface 131 will be delivered to user namespace interface 130. This pairing ensures that data communicated by applications and services in user namespace 120 may be managed by virtual switch namespace 121. Once the packet is received at paired interface 131 for operation 200, operation 200 determines whether the packet is directed to a service node in an underlay network. If the packet is directed to a service node in the underlay network, operation 200 modifies addressing of the packet prior to transmitting the packet via VNIC 135.

In some implementations, in determining whether the packet is destined for an underlay or overlay network destination, underlay operation 200 may perform packet inspection to identify a destination address for the communication. When a destination address corresponds to an overlay network destination for the user namespace (e.g. a second virtual machine in the overlay network), the packet may be encapsulated and forwarded via VNIC 135 to the overlay network destination. This encapsulation may include adding additional header information to the data packet, such as underlay network addressing. In contrast, if the destination address of the packet corresponds to a service in the underlay network, the source address in the data packet may be translated from a source address associated with the overlay network to a source address associated with the underlay network. Once translated, the modified packet may be forwarded via VNIC 135 to the service in the underlay network.

Referring to an example using service 122 of FIG. 1, when a packet is delivered to service 122 from virtual machine 110, underlay operation 200 is required to translate a source address in the packet from a source address associated with the overlay network (and user namespace 120) to a second source address associated with the underlay network and VNIC 135. Once translated the packet may be communicated to service 122. In this manner, rather than encapsulating the data packets, which is used in the communication between virtual machines on the same overlay network, the packet may be modified to support the underlay network destination.

In some implementations, once a communication has been transferred by the virtual machine using a translated source network address, communications may also be received from the destination service. For example, if virtual machine 110 were to transmit an outgoing communication using a translated source address for virtual machine 110 to service 122, when service 122 responds to the communication, virtual switch namespace 121 may be required to translate the communication from an address associated with VNIC 135 (underlay address) to an address associated with user namespace 120 (overlay address). Thus, in an outgoing communication, the source address for user namespace 120 may be translated to a second address associated with virtual machine 110 and allocated to VNIC 135, and in the return communications, the destination address may be translated back from the second address associated with virtual machine 110 to the source address associated with user namespace 120. Advantageously, this permits virtual switch namespace 121 to act as a transparent operation to translate addressing for user namespace 120 to interact with service 122.

In many implementations, the virtual switch namespace may be used to maintain state information defining where each communication is originated. In particular, when a communication request is initiated in the user namespace for a destination in the underlay network, the communication request may have the source address from the overlay network translated to the source address associated with the underlay network. In contrast, when a communication request is initiated in virtual switch namespace (e.g. a communication with a virtual switch manager, or another virtual switch), the source address for the communication will already comprise the underlay network source address. As a result, when a communication is received, by maintaining the state information, such as by using the transport protocol source port in the egress packets mapped to the transport protocol destination port in replies, the virtual switch namespace may determine whether the destination address is to be translated from the virtual switch namespace address (underlay address) to the user namespace address (overlay address) before forwarding the packet to the user namespace.

Figure 4:
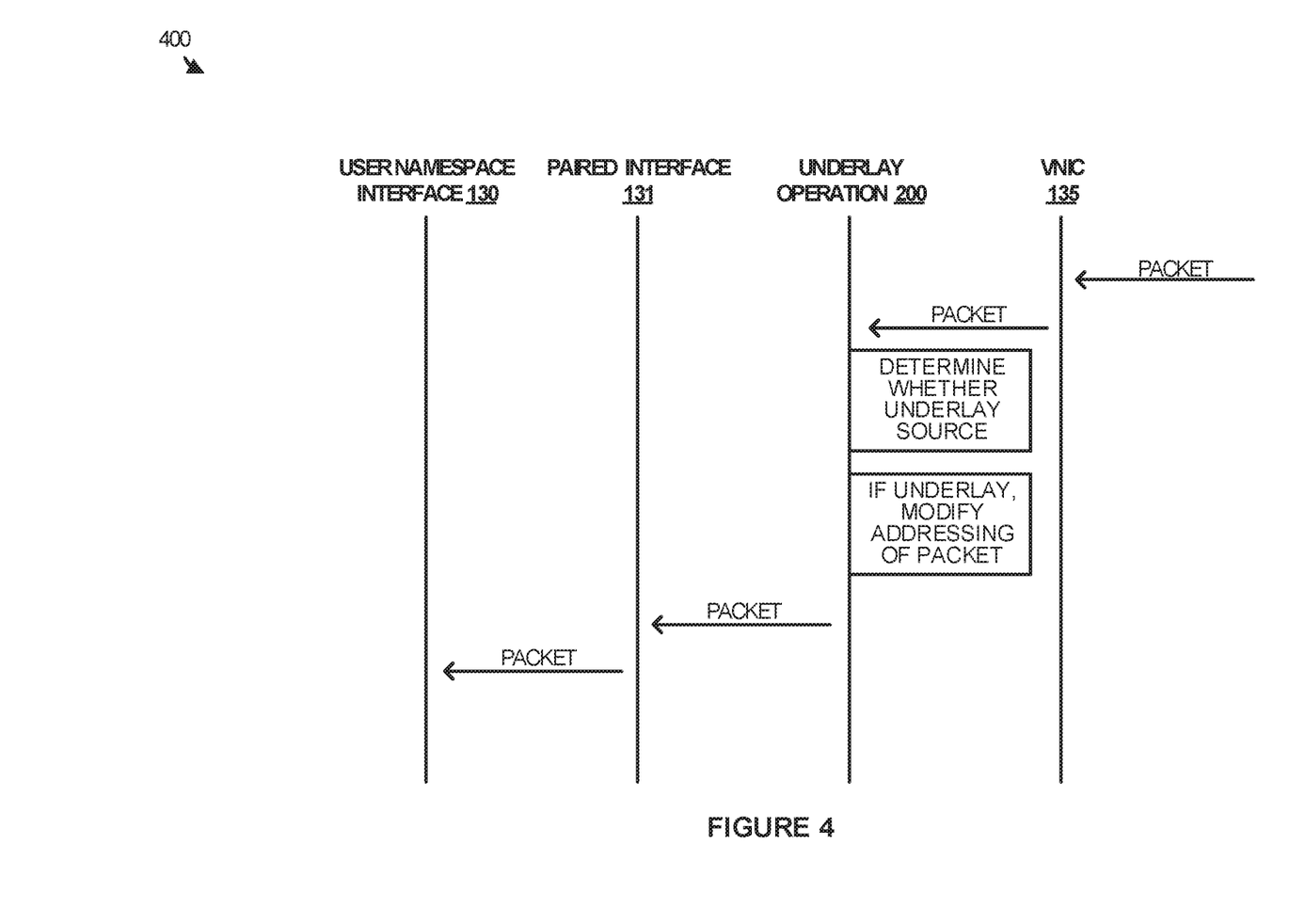
FIG. 4 illustrates an operational scenario of receiving a communication at a virtual machine according to an implementation.

FIG. 4 illustrates an operational scenario of receiving a communication at a virtual machine according to an implementation. Operational scenario 400 includes user namespace interface 130, paired interface 131, underlay operation 200, and VNIC 135 of computing environment 100 of FIG. 1.

As depicted, VNIC 135 is configured to receive communications from other virtual computing elements, physical computing systems, and services provided by a cloud service provider. When a packet is received, underlay operation 200 identifies the packet and determines whether the packet corresponds to an underlay network source. For example, if the packet were transferred from a virtual machine of the same overlay network as virtual machine 110, then the packet would be identified as corresponding to the overlay network based on the packet comprising an encapsulated overlay packet. In contrast, if the packet were delivered from service 122, then the source of the packet would be identified as an underlay source because an overlay packet would not be encapsulated within the received packet. When a packet is received from an underlay source, such as service 122, the underlay operation may first determine if the packet is destined for a service in the virtual switch namespace rather than the user namespace, wherein the determination may be made based on the destination port, the source port, protocol, or some other information for the packet. If the packet is destined for a service in the virtual switch namespace, the packet may be processed locally within the virtual switch namespace. In contrast, if it is determined that the packet is destined for the user namespace, the underlay operation may replace the underlay address associated with the virtual switch namespace with the overlay address associated with the user namespace. Once replaced, the packet may be forwarded to the user namespace.

Once the packet is inspected, and if the packet is determined to correspond to the underlay network, then underlay operation 200 may modify addressing of the packet to support user namespace 120. In particular, user namespace 120 may be associated with a different IP address than is associated with VNIC 135 of virtual switch namespace 121. As a result of this configuration, when a packet is received that has a destination IP address corresponding to the virtual machine's IP address and a source corresponding to a service in an overlay network, then the destination IP address may be translated from the virtual machine's IP address to an IP address associated with user namespace 120. Once translated, the packet may be forwarded to paired interface 131, wherein the packet is provided to user namespace interface 130.

As an illustrative example, a load balancing service may be used that is provided by the cloud service provider, wherein the load balancing service may operate on an underlay network rather than the virtual machine's overlay network. Consequently, when a packet is forwarded by the load balancing service to virtual machine 110, the packet may be inspected using virtual switch namespace 121. During the inspection, virtual switch namespace 121 may identify if the packet originated from an underlay network service and is targeted at the user namespace, and if the packet corresponds to an underlay network source and is targeted at the user namespace, translate the destination IP address (the virtual machine underlay IP address associated with the virtual switch namespace) to an IP address associated with user namespace 120 (overlay IP address). Once translated, the packet may be forwarded to user namespace 120 via paired interface 131.

In some implementations, in identifying if the packet originates from an underlay network service and is targeted at the user namespace, the virtual switch namespace may first determine if the underlay packet encapsulates an overlay packet. If encapsulated, the overlay packet may be extracted from the underlay packet and provided to the user namespace. In contrast, if the underlay packet does not encapsulate an overlay packet, the virtual switch namespace may determine if the packet is destined for a service within the virtual switch namespace (e.g. the packet is from a virtual switch controller, a second virtual switch, and the like). If destined for a service, the packet may be processed locally within the virtual switch namespace, however, if the packet is not destined for a service, the virtual switch namespace may translate the destination IP address from an underlay address associated with the virtual switch namespace to an overlay address associated the user namespace.

After a packet is transferred to user namespace 120, applications and services executing in user namespace 120 may transfer response packets to the same service. In this example, the return packets may be provided with a source network address associated with user namespace 120 (overlay address). When a return packet is identified, underlay operation may translate the address associated with user namespace 120 (overlay address) to the address associated with VNIC 135 and virtual switch namespace 121 (underlay address). Once translated, the packets may be forwarded to the service via VNIC 135. In this manner, virtual switch namespace 121 acts as a transparent operation to translate addressing for user namespace 120 to interact with services outside of the overlay network.

Although the previous examples describe a configuration of translating a destination network address for a packet, it should be understood that not all of the received packets are translated into a second destination address. In particular, if a received packet does not correspond to an underlay network service, then the packet may be decapsulated and provided to user namespace 120 via paired interface 131 and user namespace interface 130. This would ensure that an encapsulated overlay packet that is received at VNIC 135 is provided to user namespace 120 decapsulated. For example, if a second virtual machine on the overlay network were to communicate with virtual machine 110, the packet from a user namespace on the second virtual machine may be encapsulated using a virtual switch namespace. Once the packet is received at VNIC 135, virtual switch namespace 121 may identify that the packet comprises an encapsulated overlay packet, and decapsulate the packet before providing the packet to user namespace 120 via interfaces 130-131.

Figure 5:
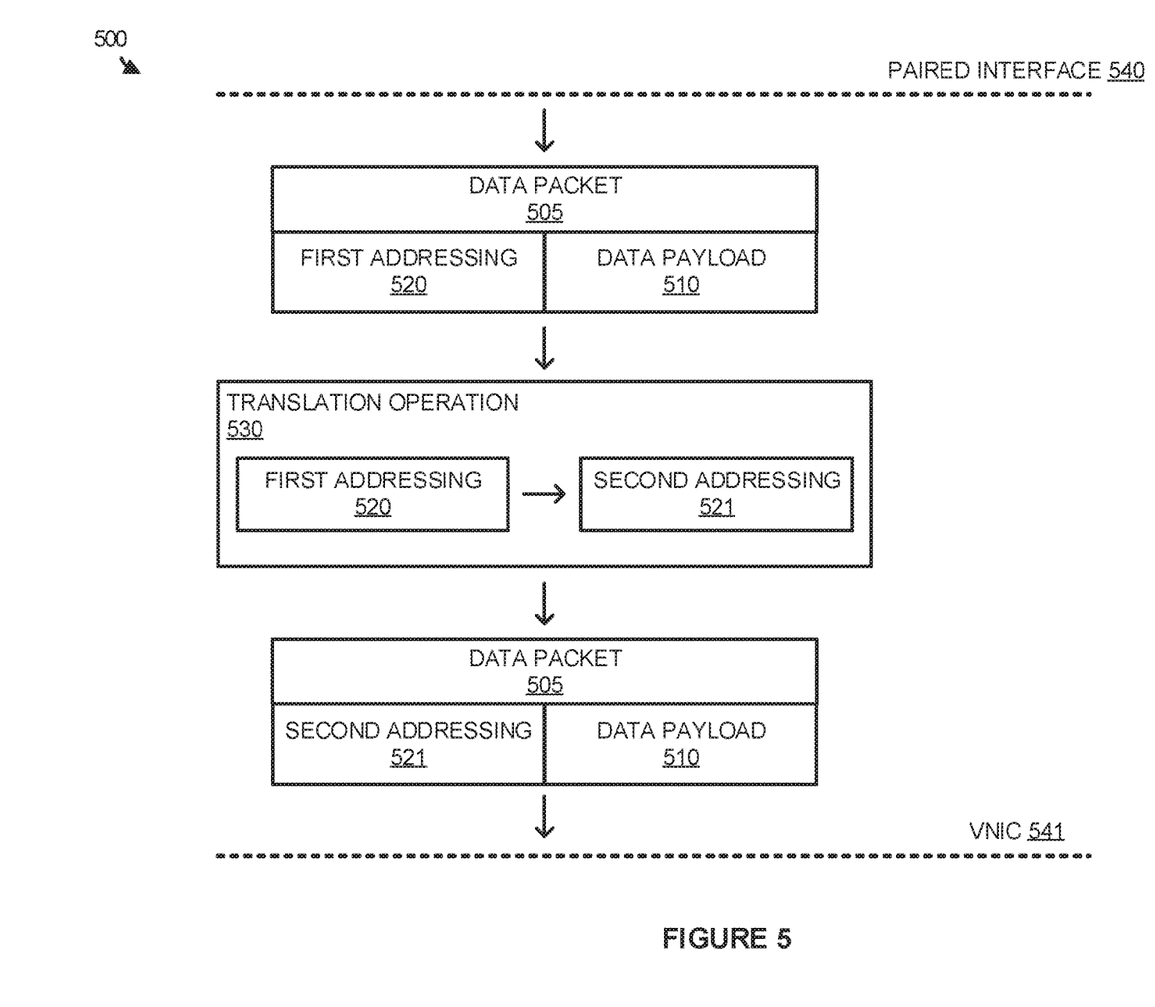
FIG. 5 illustrates a data packet communication overview for a virtual machine according to an implementation.

FIG. 5 illustrates a data packet communication overview 500 for a virtual machine according to an implementation. Data packet communication overview 500 is representative of the operations performed by a virtual switch namespace of a virtual machine on a packet provided from a user namespace (in some examples the root namespace of the virtual machine). Overview 500 is representative of a packet being communicated to an underlay network service from a user namespace and includes a data packet 505, translation operation 530, paired interface 540, and VNIC 541.

In operation, paired interface 540 is paired with a second interface for the user namespace of the virtual machine, wherein the paired interfaces comprise virtual network interfaces that permit data to be communicated between the two namespaces. When a packet, such as data packet 505, is received at paired interface 540, the virtual switch namespace may determine whether the packet is directed at a cloud based service. Here, data packet 505 includes first addressing 520 and data payload 510. In response to the virtual switch namespace determining that the packet is destined for an underlay service, translation operation 530 is used to translate first addressing 520 to second addressing 521.

In some implementations, in determining the destination for the packet, the virtual switch namespace may perform packet inspection to determine a destination network address associated with the packet. If the destination corresponds to a service of the underlay network, the virtual switch namespace may translate the source address of the packet to a second source address. In particular, the virtual machine and the VNIC 541 may be allocated a first network address, whereas the user namespace may use a second network address. Consequently, when a packet is identified that corresponds to an underlay network service, translation operation 530 may be used to translate the source address associated with the user namespace to a second source address associated with the virtual machine and the virtual switch namespace. Once translated, data packet 505 may be transmitted via VNIC 541 with second addressing 521 and data payload 510.

Although demonstrated in the previous example, as transmitting a data packet from the virtual machine, it should be understood that similar operations may be performed on packets that are received at VNIC 541. In particular, when a packet is received at VNIC 541 that originates from an underlay network service (such as a load balancer), translation operation 530 may be used to translate the address associated with the virtual machine to the address associated with the user namespace. Once translated, the data packet may be delivered to the user namespace via paired interface 540. As a result of this configuration, the virtual switch namespace may transparently provide translation operations on data packets to provide connectivity between the user namespace and services that do not reside on the overlay network.

Figure 6:
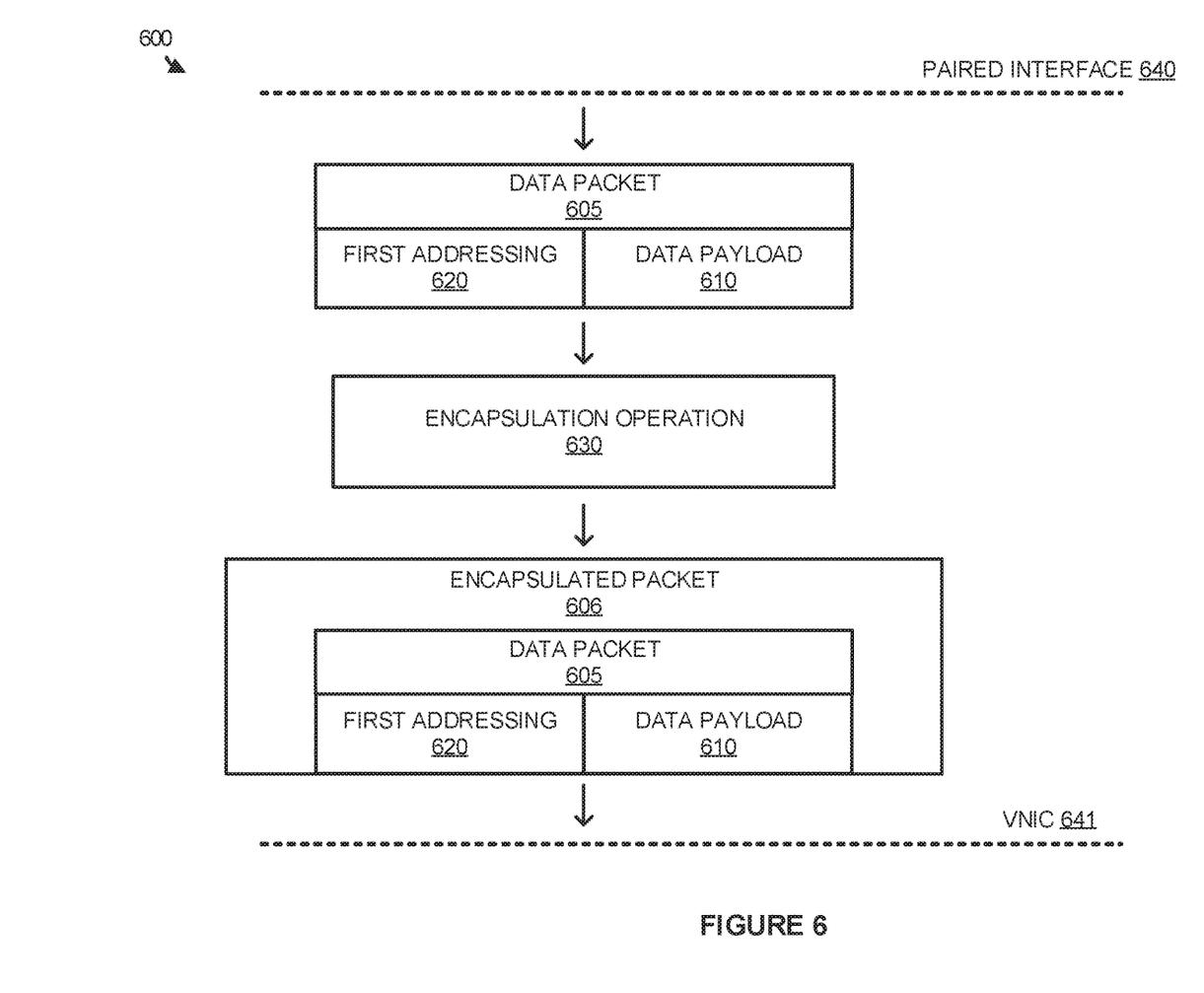
FIG. 6 illustrates a data packet communication overview for a virtual machine according to an implementation.

FIG. 6 illustrates a data packet communication overview 600 for a virtual machine according to an implementation. Data packet communication overview 600 is representative of the operations performed by a virtual switch namespace of a virtual machine, such as virtual switch namespace 121 of FIG. 1. Overview 600 is representative of a packet being communicated to an overlay network destination from a user namespace also in the overlay network. Overview 600 includes a data packet 605, encapsulated packet 606, encapsulation operation 630, paired interface 640, and VNIC 641.

In operation, a service or application operating within the user namespace may generate a data packet 605 to be communicated to another virtual machine that is part of the same overlay network. When the packet is communicated, it is transferred over the user namespace interface (virtual network interface in the user namespace) to paired interface 640 in a virtual switch namespace for the virtual machine. Once received, the virtual switch namespace may determine a destination for the packet (e.g. an internet destination, an underlay service destination, or another virtual machine or container in the overlay network). Once the destination is determined, in some implementations via packet inspection, actions may be performed on data packet 605 prior to transferring the packet via VNIC 641. Here, because the destination of data packet 605 in first addressing 620 corresponds to a destination within the overlay network, encapsulation operation 630 is performed on the packet. This encapsulation may include adding additional header information, such as source and destination addressing, port information and the like for data packet 605. Once the encapsulation is completed, the packet may be transmitted via VNIC 641.

Although this example uses the transmission of a packet from VNIC 641, it should be understood that similar operations may be performed on packets that are received at VNIC 641 for the virtual machine. In particular, encapsulated packets may be communicated that originate from other virtual nodes that belong to the overlay network. In response to receiving the encapsulated packet, the virtual switch namespace may determine whether the packet corresponds to an encapsulated packet based on packet inspection (e.g. source/destination addressing information in the packet), and may decapsulate the data packet. Once decapsulated, the packet may be forwarded to paired interface 640, wherein the packet can be received in the user namespace for processing by services and applications in the namespace. In providing the virtual switch as a namespace within the virtual machine, communications to and from applications of the virtual machine may be encapsulated and decapsulated transparently for the applications on the virtual machine. Thus, the applications may not be required to identify any underlay configurations for the communications.

Figure 7:
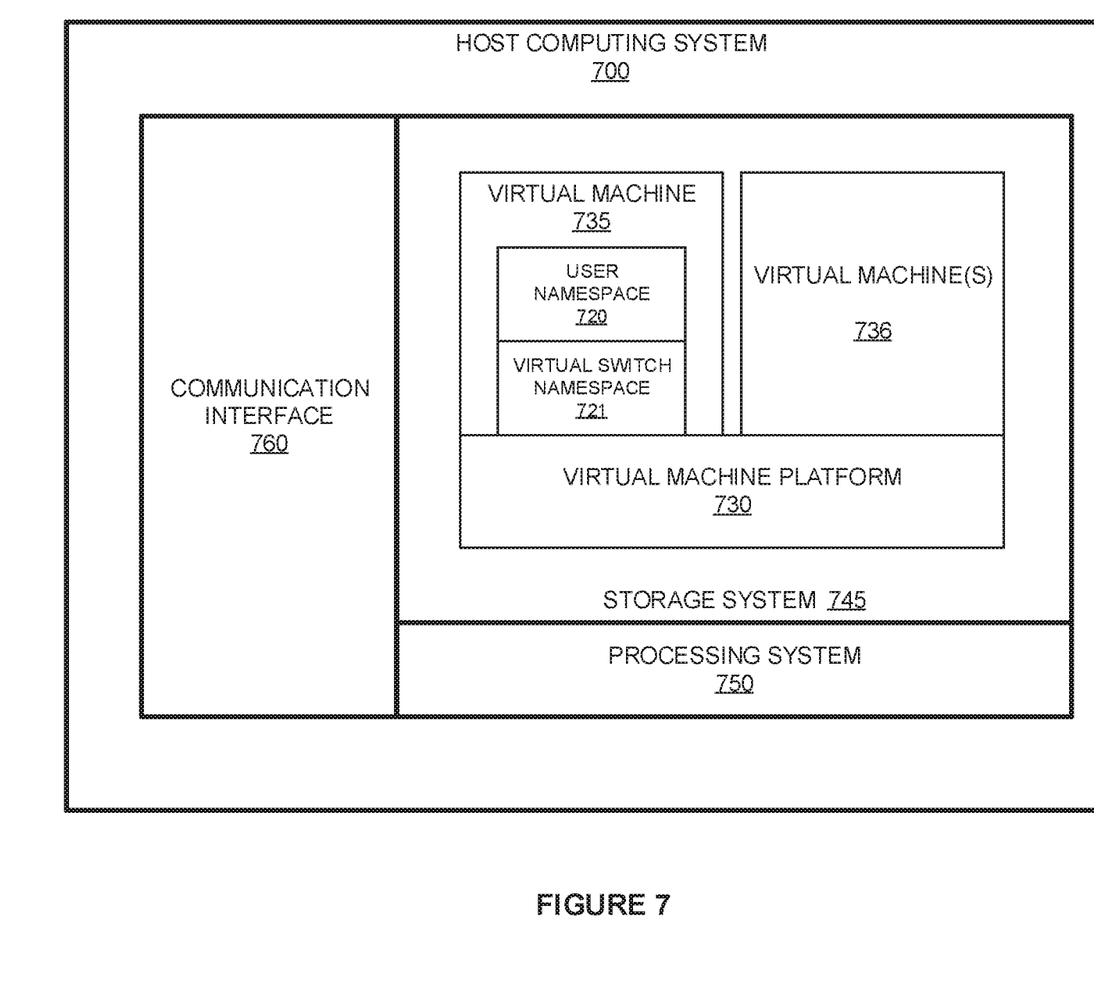
FIG. 7 illustrates a host computing system according to an implementation.

FIG. 7 illustrates a host computing system 700 according to an implementation. Host computing system 700 is representative of any computing system or systems with which the various operational architectures, processes, scenarios, and sequences disclosed herein for a host can be implemented. Host computing system 700 is an example host for virtual machine 110 of FIG. 1, although other examples may exist. Host computing system 700 includes storage system 745, processing system 750, and communication interface 760. Processing system 750 is operatively linked to communication interface 760 and storage system 745. Communication interface 760 may be communicatively linked to storage system 745 in some implementations. Host computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 is an example of physical network interface 150 and may be configured to communicate with other host computing systems in a computing environment, and may further be configured to communicate with one or more other networked computing systems and devices.

Processing system 750 comprises microprocessor and other circuitry that retrieves and executes operating software from storage system 745. Storage system 745 may include volatile and nonvolatile, removable and non-removable media implemented in any method or technology for storage of information, such as computer readable instructions, data structures, program modules, or other data. Storage system 745 may be implemented as a single storage device, but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 comprises virtual machine platform 730, virtual machine 735, and virtual machine(s) 736. Virtual machine 735 further includes user namespace 720 and virtual switch namespace 721. The operating software on storage system 745 may further include an operating system, utilities, drivers, network interfaces, applications, or some other type of software. When read and executed by processing system 750 the operating software on storage system 745 directs host computing system 700 to operate as described herein.

In at least one implementation, virtual machine platform 730 may comprise a hypervisor and at least one virtual switch that, when read and executed by processing system 750, provides an execution platform for virtual machines 735-736 and connectivity for virtual machines 735-736 with other virtual nodes, services, and external computing systems. In particular, virtual machine platform 730 may be used abstract the physical components of host computing system 700, and provide virtual components, such processing systems, storage systems, network interfaces, and the like to virtual machines 735-736. Additionally, virtual machine platform 730 may provide software defined networking operations, such as firewall, switching, and routing operations for the virtual machines.

In the present implementation, in addition to the software defined networking provided by virtual machine platform 730, virtual machine 735 includes virtual switch namespace 721. In particular, virtual switch namespace 721 may include a VNIC that is logically mapped to a virtual switch provided by virtual machine platform 730, and may further include a paired interface, which is paired to an interface in user namespace 720. In operation, virtual switch namespace 721, when read and executed by processing system 750, directs processing system 750 to receive a data packet generated in user namespace 720 and communicated via the paired interface. Once identified, virtual switch namespace 721 will determine whether the packet corresponds to an underlay network destination service, such as a load balancer, a database, or some other similar service that does not reside in the overlay network of user namespace 720. For example, user namespace 720 may be associated with a first network address (IP address) that is part of an overlay network for communications with other virtual machines and/or containers. However, when a communication is directed at a service, such as a load balancing service, the load balancing service may not be capable of identifying the overlay network source address associated with user namespace 720. As a result, when a communication is directed at a service in an underlay network for user namespace 720, virtual switch namespace 721 may translate the source address associated with user namespace 720 to a second source address associated with the VNIC for virtual machine 735. Once translated and the packet is modified with the required source address, the communication may be forwarded to the destination service via the VNIC of the virtual machine.

Although this is an example of modifying the addressing for an outgoing packet, it should be understood that similar operations may be provided for incoming packets. In particular, when a packet is received at the VNIC for virtual switch namespace 721, the namespace may determine whether the packet originated from an underlay network service, such as a load balancing service. For example, a cloud service provider may provide a load balancing service that is incapable of being added to the overlay network for the virtual machine. As a result of this configuration, when a communication is identified from the service, virtual switch namespace 721 is required to translate a destination address for the packet to an address associated with user namespace 720. For example, when a service communicates with virtual machine 735, the communication may use an IP address associated with the VNIC for the virtual machine. However, this address may be required to be translated to an overlay IP address associated with user namespace 720 before the packet is provided to the namespace.

While demonstrated in the previous examples as communicating data with a service of an underlay network, virtual switch namespace 721 may further be configured to manage packets that are communicated between nodes of the overlay network. In particular, if virtual machine 735 communicated with another virtual machine on the same overlay network, virtual switch namespace 721 may encapsulate the communication packets from user namespace 720 prior to transferring the packets to the other virtual machine. Additionally, when a packet is received from a second virtual machine operating on the overlay network, virtual switch namespace 721 may decapsulate the packet prior to providing the packet to user namespace 720.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of managing data packet addressing in a first namespace, the method comprising:
   receiving a data packet at a first interface for the first namespace, wherein the first interface is part of a veth pair with a second interface of a second namespace;
   determining whether the data packet includes a destination address for a node in an overlay network for the second namespace or the data packet includes a destination address for a node in an underlay network outside of the overlay network for the second namespace; and
   when the data packet includes a destination address for a node in the underlay network:
      replacing a first source internet protocol (IP) address with a second source IP address in the data packet to support the underlay network; and
      transferring the data packet over a network interface.

2. The method of claim 1 further comprising:
   receiving a return data packet from the service node;
   replacing the second IP source address associated with the underlay network to the first source IP address associated with the overlay network; and
   transferring the return data packet to the second namespace via the first interface.

3. The method of claim 1, wherein the destination address comprises a destination IP address.

4. The method of claim 1, wherein determining whether the data packet includes a destination address for a node in an overlay network for the second namespace or the data packet includes a destination address for a node in an underlay network outside of the overlay network for the second namespace comprises determining that the data packet includes a destination address for a node in the underlay network and the method further comprising:
   receiving a second data packet at the first interface;
   determining that the second data packet includes a second destination address for a node in the overlay network; and in response to determining that the second data packet includes a second destination address for the node in the overlay network:
      encapsulating the second data packet; and
      communicating the encapsulated second data packet over the network interface.

5. The method of claim 4, wherein encapsulating the second data packet comprises adding addressing information to the second data packet in association with the underlay network.

6. The method of claim 1, wherein the node comprises a load balancer.

7. The method of claim 1, wherein the node comprises a container or a virtual machine.

8. The method of claim 1 further comprising:
   receiving a second data packet at the network interface;
   determining whether the second data packet originated from a second node in the underlay or the overlay network; and
   when the second data packet originated from a second node in the overlay network:
      decapsulating the second data packet; and
      transfer the decapsulated second data packet to the second namespace via the first interface.

9. A computing apparatus comprising:
   a storage system;
   a processing system operatively coupled to the storage system; and
   program instructions stored on the storage system to manage data packet addressing in a first namespace that, when executed by the processing system, direct the computing apparatus to:
      receive a data packet at a first interface for the first namespace, wherein the first interface is part of a veth pair with a second interface of a second namespace;
      determine whether the data packet includes a destination address for a node in an overlay network for the second namespace or the data packet includes a destination address for a node in an underlay network outside of the overlay network for the second namespace;
      when the data packet includes a destination address for a node in the underlay network:
         replace a first source internet protocol (IP) address with a second source IP address in the data packet to support the underlay network; and
         transfer the data packet over a network interface; and
      when the data packet includes a destination address for a node in the overlay network:
         encapsulate the data packet; and
         communicate the encapsulated data packet over the network interface.

10. The computing apparatus of claim 9, wherein the destination address comprises a destination IP address.

11. The computing apparatus of claim 9, wherein encapsulating the data packet comprises adding addressing information to the data packet in association with the underlay network.

12. The computing apparatus of claim 9, wherein the node in the underlay network comprises a load balancer.

13. The computing apparatus of claim 9, wherein the node in the underlay network comprises a container or a virtual machine.

14. The computing apparatus of claim 9, wherein the program instructions further direct the computing apparatus to:

receive a second data packet at the network interface;
determine whether the second data packet originated from a second node in the underlay network or the overlay network;
when the second data packet originated from a second node in the underlay network:
replace a destination IP address in the second data packet to a destination IP address associated with the second namespace; and
transfer the second data packet to the second namespace via the first interface;
when the second data packet originated from a second node in the overlay network:
decapsulate the second data packet;
transfer the decapsulated second data packet to the second namespace via the first interface.

15. A method comprising:
receiving a data packet at a first interface for the first namespace, wherein the first interface is part of a veth pair with a second interface of a second namespace;
determining whether the data packet includes a destination Internet Protocol (IP) address for a node in an overlay network for the second namespace or a destination IP address for a node in an underlay network outside of the overlay network;
when the data packet includes a destination address for a node in the underlay network:
replace a first source internet protocol (IP) address with a second source IP address in the data packet to support the underlay network; and
transfer the data packet over a network interface; and
when the data packet includes a destination address for a node in the overlay network:
encapsulate the data packet; and
transfer the encapsulated data packet over the network interface.

16. The method of claim 15, wherein encapsulating the data packet comprises adding addressing information to the data packet in association with the underlay network.

17. The method of claim 15, wherein the node in the underlay network comprises a load balancer.

18. The method of claim 15, wherein the node in the underlay network comprises a container or a virtual machine.

19. The method of claim 15 further comprising:
receiving a second data packet at the network interface;
determining whether the second data packet originated from a second node in the underlay network or the overlay network;
when the second data packet originated from a second node in the underlay network:
replacing a destination IP address in the second data packet to a destination IP address associated with the second namespace; and
transferring the second data packet to the second namespace via the first interface;
when the second data packet originated from a second node in the overlay network:
decapsulating the second data packet; and
transferring the decapsulated second data packet to the second namespace via the first interface.

20. The method of claim 15, wherein determining whether the data packet includes a destination IP address for a node in the overlay network for the second namespace or a destination IP address for a node in the underlay network comprises:
determining whether the destination IP address matches an IP address in a data structure of IP addresses associated with the underlay network.

* * * * *